(12) United States Patent
Chen et al.

(10) Patent No.: US 9,733,678 B2
(45) Date of Patent: Aug. 15, 2017

(54) QUICK RELEASE COMPONENT CARRIER

(71) Applicant: Quanta Computer Inc., Taoyuan (TW)

(72) Inventors: Wei-Pin Chen, Taoyuan (TW);
Chao-Jung Chen, Taoyuan (TW);
Po-Chen Liu, Taoyuan (TW)

(73) Assignee: QUANTA COMPUTER, INC., Taoyuan (TW)

(*) Notice: Subject to any disclaimer, the term of this patent is extended or adjusted under 35 U.S.C. 154(b) by 0 days.

(21) Appl. No.: 14/982,304

(22) Filed: Dec. 29, 2015

(65) Prior Publication Data

US 2016/0255741 A1  Sep. 1, 2016

Related U.S. Application Data

(60) Provisional application No. 62/120,927, filed on Feb. 26, 2015.

(51) Int. Cl.
*E06C 7/00* (2006.01)
*G06F 1/18* (2006.01)

(52) U.S. Cl.
CPC ..................... *G06F 1/18* (2013.01)

(58) Field of Classification Search
CPC ...... H05K 7/1489; H05K 7/183; G06F 1/187; E06C 7/143
USPC ........ 248/314; 206/701; 361/679.39, 679.37; 312/223.2, 326
See application file for complete search history.

(56) References Cited

U.S. PATENT DOCUMENTS

| | | | | |
|---|---|---|---|---|
| 7,016,190 B1* | 3/2006 | Chang | ..................... | G06F 1/184 235/381 |
| 7,379,294 B2* | 5/2008 | Chen | ..................... | G06F 1/187 165/122 |
| 7,609,511 B2* | 10/2009 | Peng | ..................... | G11B 33/128 248/633 |
| 7,903,401 B2* | 3/2011 | Lee | ..................... | G06F 1/187 361/679.33 |
| 8,749,966 B1* | 6/2014 | Boudreau | ..................... | G06F 1/187 361/679.33 |
| 8,953,281 B1* | 2/2015 | Lee | ..................... | G11B 33/022 360/99.15 |
| 9,176,546 B2* | 11/2015 | Chen | ..................... | G06F 1/187 |
| 9,392,719 B1* | 7/2016 | Chen | ..................... | H05K 7/1417 |
| 2009/0103252 A1* | 4/2009 | Peng | ..................... | G11B 33/124 361/679.4 |
| 2011/0255235 A1* | 10/2011 | Chen | ..................... | G06F 1/187 361/679.33 |
| 2013/0099640 A1* | 4/2013 | Hu | ..................... | G11B 33/124 312/223.2 |

* cited by examiner

*Primary Examiner* — Anita M King
(74) *Attorney, Agent, or Firm* — Nixon Peabody LLP; Eduardo J. Quinones

(57) ABSTRACT

A component carrier can have a housing forming a receiving space configured to receive at least one component through a receiving opening. A pivotable sidewall can be coupled to the housing and transitionable between an open configuration and a closed configuration. A releasable latch coupled to the front portion of the housing capable of being secured the pivotable sidewall in the closed configuration. In the open configuration, the receiving opening is accessible. In the closed configuration, the pivotable sidewall secured to the housing by the releasable latch and the receiving opening is inaccessible.

9 Claims, 6 Drawing Sheets

QUICK RELEASE COMPONENT CARRIER

CROSS REFERENCE TO RELATED APPLICATIONS

This application claims priority to U.S. Provisional Application No. 62/120,927, filed Feb. 26, 2015, the contents of which are entirely incorporated by reference herein.

FIELD

The subject matter herein generally relates to a component carrier. More specifically, the subject matter herein relates to a component having a quick release for accessing a receiving space of the component carrier.

BACKGROUND

Component carriers configured to receive and hold component of electronic devices allow for easy removal of components from electronic devices. Component carriers secure a component within a receiving space, but require tools to remove the component from the component carrier.

BRIEF DESCRIPTION OF THE DRAWINGS

Implementations of the present technology will now be described, by way of example only, with reference to the attached figures, wherein.

DETAILED DESCRIPTION

Figure 1:
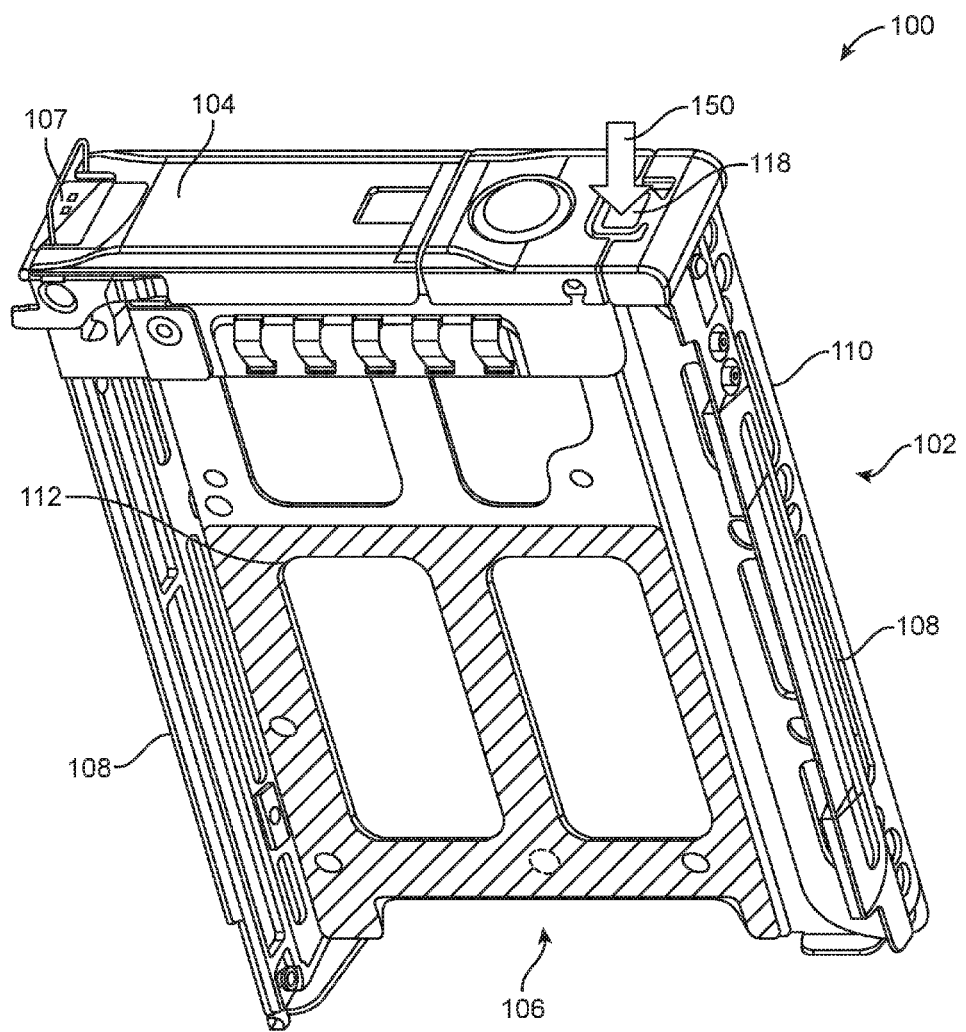
FIG. 1 is an isometric view of an example embodiment of a component carrier in a closed configuration.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is focused on increasing the ease of removing and installing components within component carriers of electronic devices. A component carrier can have a housing having a front surface, a rear portion, and two opposing sidewalls forming a receiving space. The receiving space can have a receiving opening configured to receive at least one component into the receiving space. One of the opposing sidewalls can be a pivotable sidewall coupled to the housing and transitionable between an open configuration and a closed configuration. A releasable latch disposed on the front surface of the housing capable of securing the pivotable sidewall in the closed configuration. The releasable latch is actuatable without tools, thus providing toolless access to the receiving space.

In the open configuration, the receiving opening is accessible. In the closed configuration, the pivotable sidewall secured to the housing by the releasable latch and the receiving opening is inaccessible. While the present disclosure is discussed in reference to the orientation of the illustrated embodiments, it is within this disclosure to vary the orientation of the component carrier (vertically or horizontally) to alter the reference to the top surface, bottom surface, opposing sidewalls, and the like. Further, while the present disclosure is illustrated in reference to a component carrier receivable within a sever rack assembly and capable of receiving a Hard Disk Drive (HDD), it is within the scope of this disclosure for a component carrier to receive various components including, but not limited to, Hard Disk Drives (HDD), Solid State Drives (SSD), memory cards, network cards, video cards, and other electronic device related components. Electronic devices include servers, laptops, personal computers, smart phones, tablets, game consoles, and other known electronic devices in the art.

Figure 2:
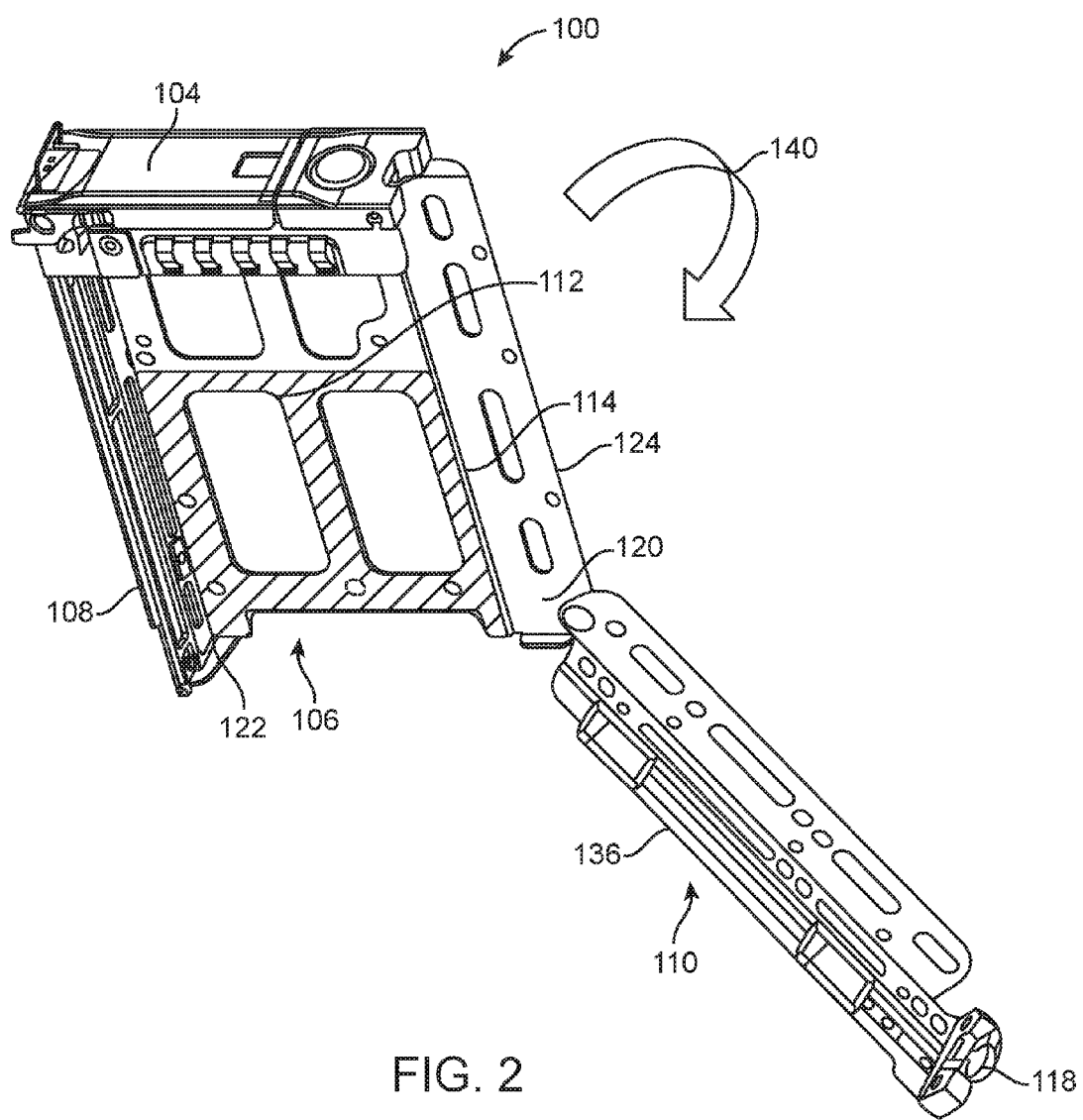
FIG. 2 is an isometric view of an example embodiment of a component carrier in an open configuration.

FIG. 1 illustrates a component carrier in a closed configuration. FIG. 2 illustrates a component carrier in an open configuration. A component carrier 100 includes a housing 102 that can have a front portion 104, a rear portion 106, and two opposing sidewalls 108 forming a receiving space 112. The receiving space 112 has a receiving opening 114 configured to receive at least one component 116 (shown in FIG. 4) into the receiving space 112 of the component carrier 100. At least one of the opposing sidewalls 108 is a pivotable sidewall 110 coupled to the housing 102 and transitionable between an open configuration and a closed configuration. The pivotable sidewall 110 can be coupled to the front portion 104 of the housing 102 by a releasable latch 118. The releasable latch 118 is capable of securing the pivotable sidewall 110 in the closed configuration. In at least one embodiment, the releasable latch 118 is a push button latch that releases the pivotable sidewall 110 when the push button is actutated by a user. In other embodiments, the releasable latch 118 can have a slide mechanism configured to release the pivotable sidewall 110 when actuated. In yet other embodiments, the releasable latch 118 can be any releasable securing mechanism known in the art capable of releasbly coupling the pivotable sidewall 110 with the housing 102.

In the closed configuration, the pivotable sidewall 110 is secured to the housing 102 by the releasable latch 118. Thus, the receiving opening 114 is inaccessible and a component 116 cannot be received into or removed from the receiving space 112. As can be appreciated in FIG. 1, the releasable latch 118 is actuated by applying a pushing force 150 on releasable latch 118. The pushing force 150 can actuate the releasable latch, thereby transitioning the component carrier 100 from closed to open position.

In the open configuration, the receiving opening 114 is accessible allowing a component 116 to be receivable within the receiving space 112. (Shown in FIG. 4). As can be appreciated in FIG. 2, the pivotable sidewall 110 is decoupled from the releasable latch 118 and transitioned away from the housing 102 to provide access to the receiving space 112. The pivotable sidewall 110 can be pivoted away from the housing 102 in an opening direction 140. The opening direction 140 can direct the pivotable sidewall 110 away from the housing 102 to expose the receiving opening 114.

As can further be appreciated in FIG. 2, the pivotable sidewall 110 of the component carrier 100 is pivotably coupled to a top surface 120 of the component carrier 100 adjacent to the rear portion and movable within the same plane as the top surface 120. In other embodiments, the pivotable sidewall 110 can be coupled to the top surface 120 of the component carrier 100 adjacent to the rear portion 106, and moveable within a plane opposite, or substantially perpendicular, to the top surface 120.

In other embodiments, the pivotable sidewall 110 can be coupled to a bottom surface 122 adjacent to the rear portion 106, and movable within the same plane as bottom surface 122 or in a plane opposite, or substantially perpendicular, to the bottom surface 122. In yet other embodiments, the pivotable sidewall can be coupled along an edge 124 formed between the top surface 120 and the pivotable sidewall 110. The pivotable sidewall 110 being pivotable about the edge 124. In yet other embodiments, the pivotable sidewall can be coupled along an edge 136 formed between the bottom surface 122 and the pivotable sidewall 110. The pivotable sidewall 110 being pivotable about the edge 136.

As can be appreciated in FIGS. 1 and 2, the component carrier 100 can include a status indicator 107 disposed on the front portion 104. The status indicator 107 can be a status light indicating status, function, or communication of the component 116 with the server rack assembly 200 (shown in FIG. 3). The status indicator 107 can be an optical cable configured to transmit light from a light source located on adjacent to the rear portion 106. The light source can be an LED, bulb, or other light source located on the server rack assembly 200, or component 116. In other embodiments, the status indicator 107 can be an LED or other light source communicatively coupled with the server rack assembly 200.

Figure 3:
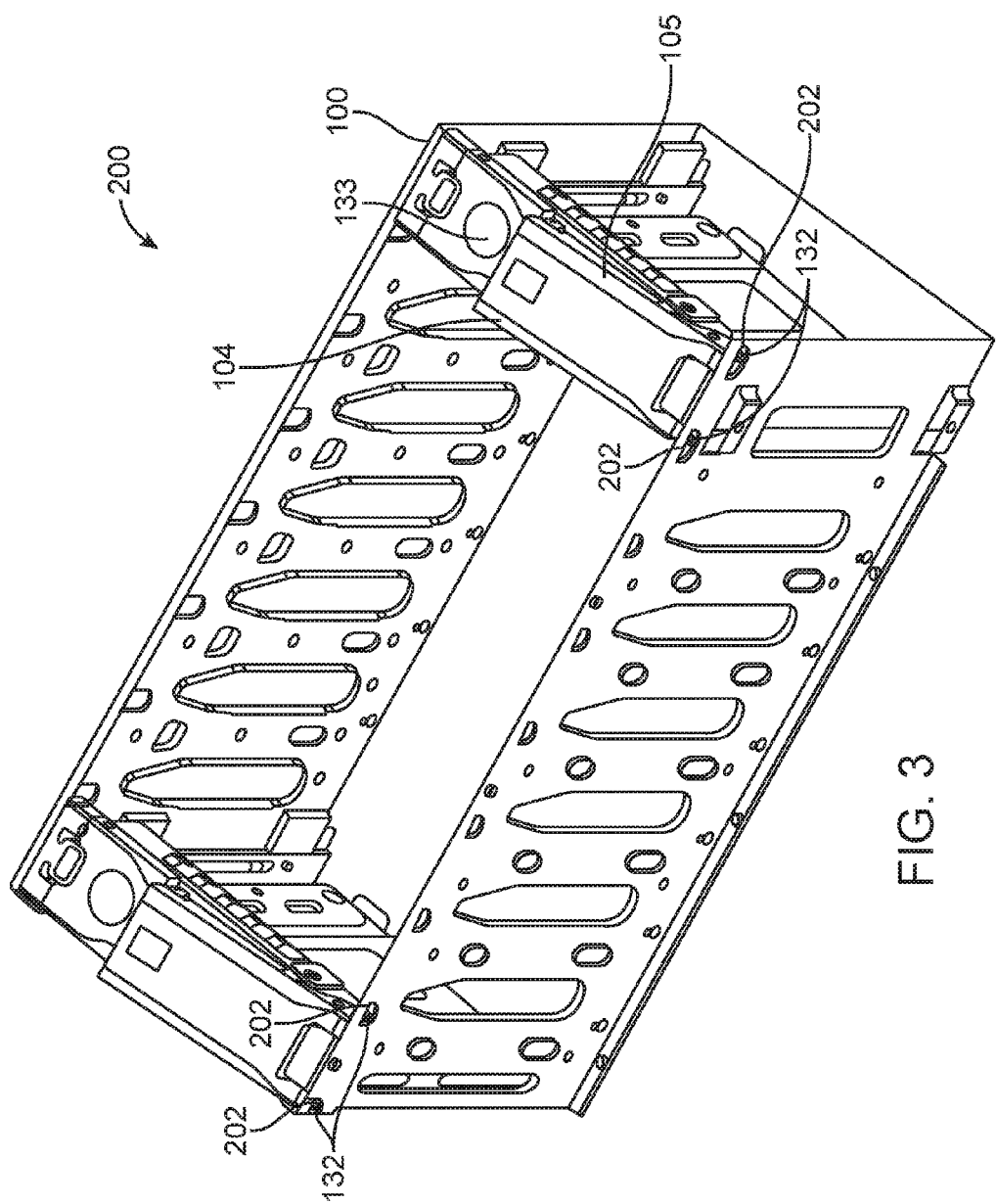
FIG. 3 is an isometric plan view of an example embodiment of a server racket assembly receiving a component carrier.

FIG. 3 illustrates a server rack assembly receiving two component carriers 100. The component carrier 100 can be receivable into and removable from a server rack assembly 200. The server rack assembly 200 can be configured to receive a plurality of component carriers 100 arranged vertically or horizontally. In the illustrated embodiment, the component carrier 100 can be received in the server rack assembly 200 in a substantially vertical arrangement such that the front portion 104 is the uppermost surface of the component carrier 100 when received into the server rack assembly 200 and the front portion 104 and rear portion 106 are substantially aligned along a vertical axis.

In other embodiments, the component carrier 100 can be received in a substantially horizontal arrangement such that the front portion 104 and rear portion 106 are substantially aligned along a horizontal axis. In a horizontal arrangement, the server rack assembly 200 can receive one or more component carriers 100 with a top surface 120 being the uppermost surface, or with one of the two opposing sidewalls 108 being the uppermost surface.

As can be appreciated in FIG. 3, the sever rack assembly 200 can receive the component carrier 100 in a substantially vertical arrangement such that the front portion 104 is the uppermost surface of the component carrier 100. The component carrier 100 can be coupled with the server rack assembly 200 by a server latch assembly 130. The server latch assembly 130 can have a protrusion 132 extending away therefrom. The protrusion 132 is releasbly receivable in a groove 202 formed in the server rack assembly 200, thereby coupling the component carrier 100 with the server rack assembly 200. The front portion 104 of the component carrier 100 can have a release mechanism 133 configured to actuate the server latch assembly 130 and decouple the protrusion 132 from the groove 202. In the illustrated embodiment, the release mechanism 133 is spring biased to return to an original position upon decoupling. The server latch assembly 130 can be a portion of the front portion 104 and pivot about a sidewall opposite the pivotable sidewall 110.

Figure 4:
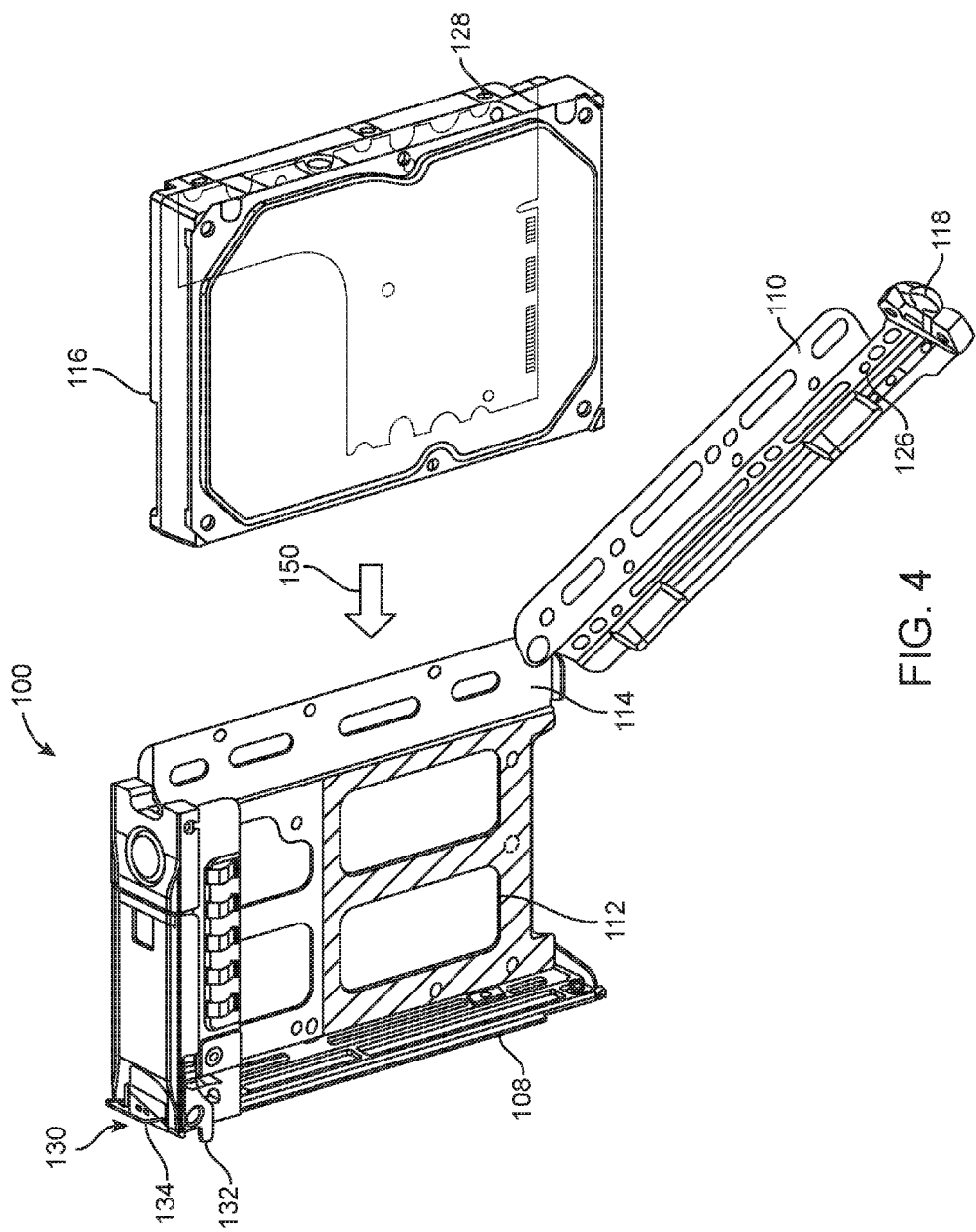
FIG. 4 is an isometric view of an example embodiment of a component carrier in an open configuration receiving a component.

FIG. 4 illustrates a component carrier in an open configuration configured to receive a component. The component 116 is received into the receiving space 112 of component carrier 100 through the receiving opening 114. The component 116 is received in a sliding direction 150 while the component carrier 100 is in the open configuration.

The opposing sidewalls 108 can have protrusions 126 extending into the receiving space 112 to engage corresponding protrusion receiving spaces 128 on the component 116. The protrusions 126 can engage the corresponding receiving spaces 128 to secure and align the component 116 in the receiving space 112. Securement within the receiving space 112 can prevent movement and jostling of the component 116, thereby preventing damage to the component 116 as the component carrier 100 is removed and received into the server rack assembly 200 (shown in FIG. 3). Proper alignment of the component 116 within the receiving space 112 ensures proper coupling of the component carrier 100 with the server rack assembly 200. In other embodiments, the component 116 can have protrusions 126 formed thereon and the component carrier can have corresponding receiving spaces 128 formed therein.

In at least one embodiment, the protrusions 126 are cylindrical protrusions extending into the receiving space from each of the opposing sidewalls 108 to engage corresponding cylindrical receiving spaces 128 on the component 116. In other embodiments, the protrusions 126 can be other polygonal shaped protrusions or tabs to secure the component 116 in the receiving space 112.

As can be appreciated in FIG. 4, in the open position, the pivotable sidewall 110 rotates away from the housing 102, thereby providing access to the receiving opening 114. The receiving opening 114 is slightly larger than at least one sidewall of the at least one component 116 to allow receipt and removal of the component 116.

As can further be appreciated in FIG. 4, the opposing sidewalls 108 each have two protrusions 126 extending into the receiving space 112. The component 116 has two corresponding protrusion receiving spaces 128 on each sidewall to engage the two protrusions 126 of the component carrier 100.

Figure 5:
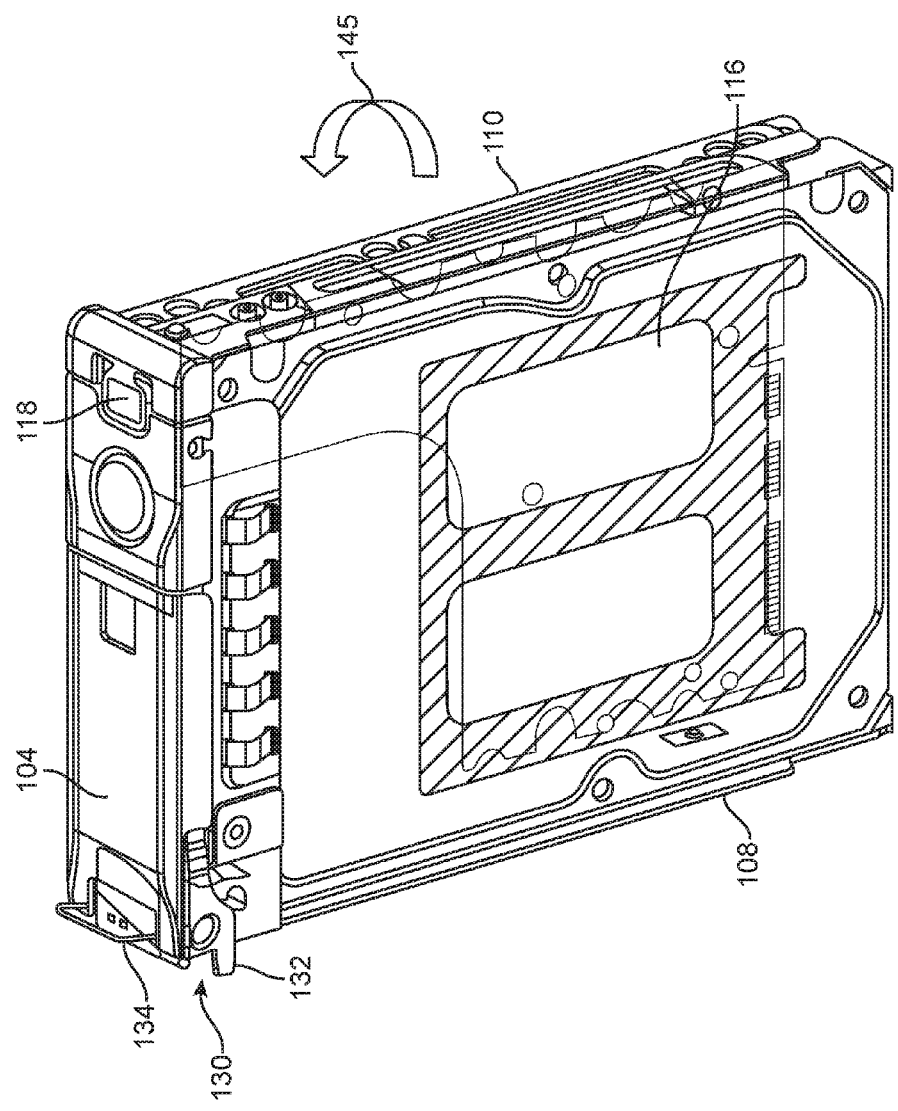
FIG. 5 is an isometric view of an example embodiment of a component carrier in a closed configuration having a component received therein.
Figure 6:
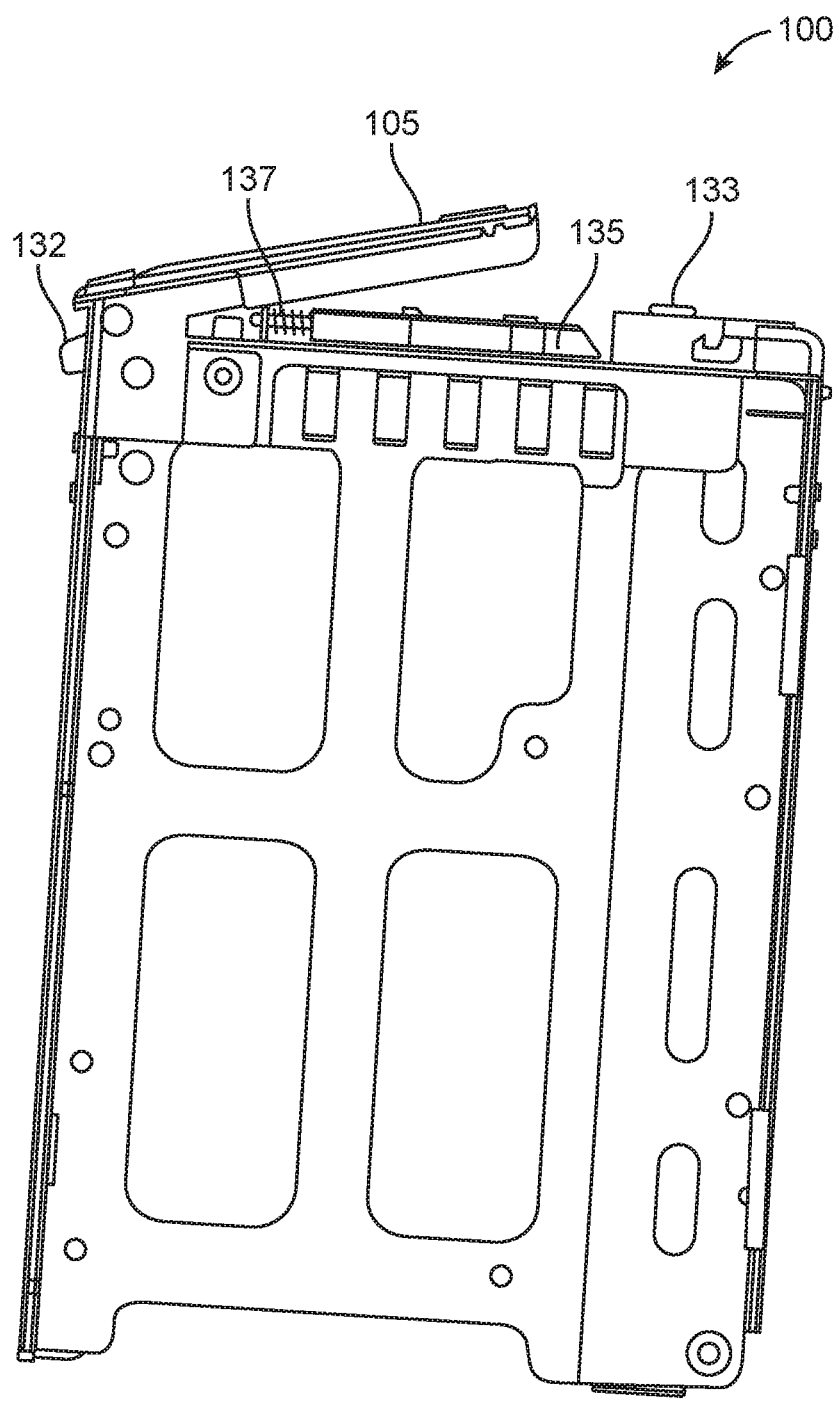
FIG. 6 is an isometric view of an example embodiment of a component carrier having a front bezel removed.

FIG. 5 illustrates a component carrier in a closed configuration having a component received in a receiving space. FIG. 6 illustrates a component carrier in a closed configuration having a front bezel unlatched. The pivotable sidewall 110 can be pivoted in a closed direction 145 to cover the receiving opening 114 thereby enclosing the receiving space 112. The pivotable sidewall 100 pivots in the closing direction 145 toward the housing 102 until received in the releasable latch 118.

The component carrier 100 can have a component 116 secured in the receiving space 112 when the pivotable sidewall 108 in the closed configuration. The component carrier 100 can be insertable into and removable from a server rack assembly 200, thereby coupling the component 116 with the server rack assembly 200 (shown in FIG. 3). The component carrier 100 has server latch assembly 130 to couple and decouple the component carrier 100 with the server rack assembly 200. The server latch assembly 130 allows the component carrier 100 to be removed from the server rack assembly 200. In at least one embodiment, the component carrier 100 is received and removed from the server rack assembly 200 in a vertical direction. In other embodiments, component carrier 100 can be received and removed from the server rack assembly 200 in a horizontal direction, or any direction between horizontal and vertical.

As can be appreciated in FIG. 6, actuation of the server latch assembly 130 can pivot a bezel 105 of the front portion 104 relative to the sidewall 108 opposite the pivotable sidewall 110. The bezel 105 can be any portion of the front portion 104. In the illustrated embodiment the bezel 105 is about half the front portion 104. In other embodiments, the bezel 105 can be substantially less than half the front portion 104, or the bezel 105 can be substantially more than half the front portion 104.

The release mechanism 133 is spring biased 137 toward a closed position and has a snub nosed portion 135 configured to release the bezel 105 of the front portion 104 and decouple the protrusion 132 from the groove 202. The groove 202 can be formed on any surface of the server rack assembly 200 and the protrusion 132 can be formed on any surface of the component carrier 100 so as to align with the groove 202 when the component carrier 100 is received within the server rack assembly.

In other embodiments, the sever rack assembly 200 can have a protrusion extending therefrom and the component carrier 100 can have a groove configured to receive the protrusion. A release mechanism 133 can eject the protrusion and decouple the component carrier 100 from the server rack assembly 200.

The server latch assembly 130 can also include a securing spring arrangement 137 to provide compression securement between the component carrier 100 and the server rack assembly 200. The component carrier can include more than one server latch assembly 130 working in conjunction with one another, such as a protrusion and groove arrangement and securing spring arrangement collectively coupling the component carrier 100 with the server rack assembly 200.

As can be appreciated in FIG. 5, the component carrier 100 has a sever latch assembly 130 having protrusion 132 extending away from the housing 102. The protrusion 132 configured to be received in a corresponding groove (not shown) on a server rack assembly. The component carrier 100 also includes a handle 134 coupled to the protrusion 132. In at least one embodiment, the handle 134 capable of actuating the protrusion 132 into and out of the corresponding groove (shown in FIG. 6), thereby coupling and decoupling the component carrier 100 from the server rack assembly. In other embodiments, the handle 134 can be fixed and assists removal of the component carrier 100 from the server rack assembly.

As can further be appreciated in FIG. 5, the component carrier 100 has a sever latch assembly 130 including a securing spring arrangement. The component carrier 100 has five compression springs 137 on the bottom surface to engage and compress the server rack assembly. The compression springs 137 create a pressure fit between the component carrier 100 and the server rack assembly and can work in combination with the protrusion 132 and groove (shown in FIG. 6). The handle 134 can also assist a user in overcoming the compression force when removing or inserting the component carrier 100 into the server rack assembly. While the illustrated embodiment is shown having five compression springs 137 on the bottom surface, the component carrier 100 can have one, two, three, four, or more than five compression springs 137 configured to generate a pressure fit between the component carrier 100 and the server rack assembly.

It is believed the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiments of the disclosure.

What is claimed is:

1. A component carrier comprising:
   a housing forming a receiving space configured to receive at least one component through a receiving opening;
   a pivotable sidewall coupled to a top surface of the housing and transitionable between an open configuration and a closed configuration; and
   a releasable latch coupled to the top surface of the housing and capable of securing the pivotable sidewall in the closed configuration;
   wherein the pivotable sidewall is coupled along an edge of the top surface;
   wherein in the open configuration the receiving opening is accessible;
   wherein in the closed configuration the pivotable sidewall is secured to the housing by the releasable latch and the receiving opening is inaccessible.

2. The component carrier of claim 1, wherein the pivotable sidewall is coupled to a top surface and adjacent to a rear portion of the housing.

3. The component carrier of claim 2, the pivotable sidewall is moveable within the same plane as the top surface.

4. The component carrier of claim 2, wherein the pivotable sidewall is moveable within a plane opposite to the top surface.

5. The component carrier of claim 1, wherein the pivotable sidewall is coupled to a bottom surface and adjacent to a rear portion of the housing.

6. The component carrier of claim 5, the pivotable sidewall is moveable within the same plane as an opposing sidewall.

7. The component carrier of claim 5, wherein the pivotable sidewall is moveable within a plane opposite to an opposing sidewall.

8. The component carrier of claim 1, wherein the pivotable sidewall coupled to the housing encloses at least one component in the receiving space.

9. The component carrier of claim 1, wherein the housing is releasably receivable within a server rack assembly.

\* \* \* \* \*